US012452161B2

(12) United States Patent
Nophut et al.

(10) Patent No.: US 12,452,161 B2
(45) Date of Patent: Oct. 21, 2025

(54) NETWORK NODES, WIRELESS NETWORKS, AND METHODS OF CONTROLLING THEM

(71) Applicant: Meshmerize GmbH, Dresden (DE)

(72) Inventors: David Nophut, Dresden (DE); Frank Gabriel, Dresden (DE); Simon Wunderlich, ThoBfell (DE)

(73) Assignee: Meshmerize GmbH, Dresden (DE)

( * ) Notice: Subject to any disclaimer, the term of this patent is extended or adjusted under 35 U.S.C. 154(b) by 560 days.

(21) Appl. No.: 17/456,202

(22) Filed: Nov. 23, 2021

(65) Prior Publication Data

US 2022/0173998 A1    Jun. 2, 2022

(30) Foreign Application Priority Data

Nov. 25, 2020   (DE) .................... 10 2020 131 210.5

(51) Int. Cl.
*H04L 45/18*   (2022.01)
*H04L 45/02*   (2022.01)
*H04L 45/16*   (2022.01)

(52) U.S. Cl.
CPC .............. *H04L 45/16* (2013.01); *H04L 45/02* (2013.01)

(58) Field of Classification Search
USPC ........................................................ 370/254
See application file for complete search history.

(56) References Cited

U.S. PATENT DOCUMENTS

| | | | | |
|---|---|---|---|---|
| 9,952,055 | B2* | 4/2018 | Tava | G01C 21/3446 |
| 10,374,745 | B1* | 8/2019 | Tanzi | H04J 14/0271 |
| 10,484,925 | B1* | 11/2019 | Chen | H04W 40/16 |
| 2006/0198346 | A1* | 9/2006 | Liu | H04W 40/24 |
| | | | | 370/254 |
| 2014/0098674 | A1* | 4/2014 | Sonoda | H04L 49/3009 |
| | | | | 370/235 |
| 2015/0029954 | A1* | 1/2015 | Victor | H04L 12/5692 |
| | | | | 370/329 |
| 2016/0134543 | A1* | 5/2016 | Zhang | H04L 45/12 |
| | | | | 370/235 |
| 2017/0111767 | A1* | 4/2017 | Xie | H04W 64/003 |
| 2018/0054827 | A1* | 2/2018 | Chen | H04W 72/542 |
| 2018/0343192 | A1* | 11/2018 | Antonyraj | H04L 45/16 |
| 2019/0182841 | A1* | 6/2019 | Soldati | H04W 72/0453 |
| 2019/0364440 | A1* | 11/2019 | Juven | H04W 40/02 |
| 2020/0162344 | A1* | 5/2020 | Zapponi | H04L 41/044 |
| 2021/0297128 | A1* | 9/2021 | Badic | H04B 7/0695 |
| 2021/0345085 | A1* | 11/2021 | Anselm | H05B 47/199 |

(Continued)

*Primary Examiner* — Gregory B Sefcheck
*Assistant Examiner* — Majid Esmaeilian
(74) *Attorney, Agent, or Firm* — Barnes & Thornburg LLP; Jeffrey R. Stone (57) ABSTRACT

A network node and a method for controlling a wireless network are disclosed, wherein the network node includes a receiving device configured co receive data packets from one or more other network nodes of a plurality of network nodes; one or more processors configured to determine two or more network nodes of the plurality of network nodes to which the network node may forward data packets such that a number of the determined two or more network nodes is greater than a predefined first threshold value; and a transmitting device configured to forward the received data packets to the determined two or more network nodes of the plurality of network nodes.

20 Claims, 6 Drawing Sheets

(56) References Cited

U.S. PATENT DOCUMENTS

| | | | | |
|---|---|---|---|---|
| 2022/0394542 A1* | 12/2022 | Belleschi | .......... | H04W 28/0278 |
| 2023/0188426 A1* | 6/2023 | Zhang | .................... | H04L 41/12 |
| | | | | 709/223 |
| 2023/0422076 A1* | 12/2023 | Lunardi | ............ | H04W 28/0958 |

* cited by examiner

Transmitting data packets from a starting network node of the plurality of network nodes to a destination network node of the plurality of network nodes by means of one or more other network nodes of the plurality of network nodes, wherein each network node of the one or more other network nodes:

502 determines one or more network nodes of the plurality of network nodes to which the network node may forward data packets, such that a number of the determined one or more network nodes is greater than a predefined first threshold and/or that a number of connections to the determined one or more network nodes is greater than a predefined second threshold

504 forwards the data packets to the determined one or more network nodes

NETWORK NODES, WIRELESS NETWORKS, AND METHODS OF CONTROLLING THEM

This application claims priority to German Patent Application No. DE 10 2020 131 210.5, filed Nov. 25, 2020, which is incorporated herein by reference in its entirety.

Various aspects involve a network node, a wireless network, and methods for controlling the same.

Wireless networks may be implemented as decentralized wireless networks, for example in the form of meshed wireless networks, where the network nodes of the wireless network may receive and send data packets and forward them. For example, if an originating network node does not have a direct connection to a destination network node, data packets may be transmitted by means of, i.e. forwarded by, other network nodes. However, if a connection between two of the network nodes breaks down, the data packets may not reach the destination network node and retransmission of the data packets from the starting network node by means of forwarding network nodes, which in this case may be different from the previous transmission, to the destination network node may be required. This may require a large amount of time, up to 15 seconds or even longer. Therefore, it may be necessary to provide a wireless network and a method by means of which these downtimes are reduced (e.g., prevented). In the wireless network, if data packets are transmitted from multiple starting network nodes to multiple respective destination network nodes, a high number of transmissions may be forwarded over the same network node, which may cause the connection to break down at that network node, for example. Therefore, it may be necessary to provide a wireless network and method with increased transmission stability.

According to various embodiments, a network node in a wireless network, a wireless network, and methods for controlling the same are provided, by means of which the reliability of data transmission is increased. This may, for example, significantly reduce (e.g., prevent) downtime.

According to various embodiments, a network node in a wireless network may include a receiving device and one or more processors, wherein the receiving device is configured to receive data packets from one or more other network nodes of a plurality of network nodes, and wherein the one or more processors are configured to determine one or more network nodes of the plurality of network nodes to which the network node may forward data packets such that a number of the determined one or more network nodes is greater than a predefined first threshold and/or that a number of connections to the determined one or more network nodes is greater than a predefined second threshold.

The network node having the features of independent claim 1 forms a first example.

Such determination of one or more network nodes has, for example, the effect of significantly increasing a probability that a data transmission will reach a destination network node. This reduces, for example, downtime of the wireless network. This is achieved, for example, by each network node by means of which the data packets are forwarded towards the destination network node ensuring that the data packets are forwarded to a minimum number of other network nodes (and/or by means of a minimum number of connections).

In one example, each network node may determine a transmission metric that takes into account a distance and/or transmission rates between neighboring network nodes, and may transmit data packets to other network nodes as a function of this transmission metric such that a probability of successful transmission is above a threshold. This may result in data packets being forwarded to only a single network node, which has a small distance and/or high transmission rates and thus a high associated probability of successful transmission. However, this connection may break down (e.g., as the two network nodes move away from each other) or the data packets may not be transmitted due to other causes. Consequently, this requires retransmission of the data packets and thus results in downtime. According to the first example, it may be ensured that the number of network nodes to which the data packets are (may be) transmitted has a minimum number, so that the data packets are forwarded to at least two network nodes in each case, for example.

Such network nodes may be used, for example, for communication between autonomous (e.g., semi-autonomous, e.g., fully autonomous) vehicles, between drones, between robots (e.g., logistics robots), etc.

The network node may further comprise a transmitting device configured to forward the received data packets to the determined one or more network nodes of the plurality of network nodes. The features described in this paragraph in combination with the first example form a second example.

The transmitting device may be configured to transmit the data packets to at least one network node of the determined one or more network nodes by means of at least two connections with mutually different assigned frequency ranges. The features described in this paragraph in combination with the second example form a third example.

The transmitting device may be configured to forward the data packets to the determined one or more network nodes towards one or more destination network nodes. The features described in this paragraph in combination with the second example or the third example form a fourth example.

The transmitting device may be configured to transmit the data packets to a plurality of network nodes of the determined one or more network nodes using multicast communication. The features described in this paragraph in combination with one or more of the second example to the fourth example form a fifth example.

The one or more processors may be configured to determine Whether the data packets may be transmitted to a plurality of network nodes using the multicast communication. The one or more processors may be configured to select the one or more network nodes of the plurality of network nodes such that: the number of the determined one or more network nodes is greater than the predefined first threshold; and/or the number of connections to the determined one or more network nodes is greater than the predefined second threshold; and the data packets are transmitted co a plurality of the network nodes using the multicast communication if the one or more processors determine that the data packets may be transmitted to a plurality of network nodes using the multicast communication. The features described in this paragraph in combination with the fifth example form a sixth example.

Illustratively, this provides support for selecting a modulation and code rate (MOS) in the wireless network.

The one or more processors may be configured to determine, for each potential network node to which the network node may forward data packets, a reception probability for the data packets using provided transmission measurement data. The features described in this paragraph in combination with one or more of the first example through the sixth example form a seventh example.

The transmitting device may be configured to forward the data packets to the one or more network nodes such that the reception probability for the data packets of each network node of the determined one or more network nodes is greater than a predefined third threshold. The features described in this paragraph in combination with the second example and the seventh example form an eighth example.

The transmitting device may be configured to increase the reception probability for the data packets of a network node of the one or more network nodes by transmitting the data packets multiple times and/or by reducing an associated data transmission rate. The features described in this paragraph in combination with the seventh example or the eighth example form a ninth example.

The one or more processors may be configured to determine the one or more network nodes of the plurality of network nodes according to a selection operation. The selection operation may comprise: determining one or more potential network nodes to which the at least one network node may forward data packets; determining a respective distance from the at least one network node for each of the one or more potential network nodes; determining a respective transmission overhead for each of the one or more potential network nodes; determining one or more network nodes from the one or more potential network nodes such that the number of determined one or more network nodes is greater than the predefined first threshold or the number of connections to the determined one or more network nodes is greater than the predefined second threshold, and a ratio of the summed distance of the determined one or more network nodes and the transmission overhead to the determined one or more network nodes is increased. The features described in this paragraph in combination with one or more of the first example through the ninth example form a tenth example.

Such an efficiency metric, which takes into account the distance (e.g., a distance traveled in the direction of a destination network node) and relates it to the transmission overhead required for it, has the effect of increasing a resource efficiency, for example, by reducing a number of transmissions. Illustratively, a time in which network nodes of the wireless network transmit data packets may be reduced in this way. Illustratively, this may result in an increased throughput in data transmission (for example, using a transmission protocol set up in this manner).

The one or more processors may be configured to determine transmission overhead using multicast communication. The features described in this paragraph in combination with the tenth example form an eleventh example.

The network node and/or at least one network node of the plurality of network nodes may be associated with a mobile device, a server, or a router. The features described in this paragraph in combination with one or more of the first example to the eleventh example form a twelfth example.

The wireless network may be a meshed wireless network. The feature described in this paragraph in combination with one or more of the first example through the twelfth example forms a thirteenth example.

The wireless network may be a WLAN network, a Bluetooth network, or a cellular network. The features described in this paragraph in combination with one or more of the first example through the thirteenth example form a fourteenth example.

The wireless network may be a dynamic wireless network. The feature described in this paragraph in combination with one or more of the first example through the fourteenth example forms a fifteenth example.

A wireless network may nave a plurality of network nodes, wherein at least one network node of the plurality of network nodes may be a network node according to one or more of the first example to the fifteenth example. The wireless network having the features described in this paragraph forms a sixteenth example.

In one example, a plurality (for example, all) of network nodes of the plurality of network nodes may be a network node according to one or more of the first example to the fifteenth example.

Especially in dynamic wireless networks, control information may quickly become outdated and lead to long downtimes if data packets do not arrive due to the outdated control information.

Using network nodes described herein has the effect of significantly reducing such downtime. Illustratively, multiple paths are provided for the transmission of data packets from a starting network node to a destination network node by means of other network nodes, such that a failure of a link between two of the other network nodes does not result in a failure of the transmission because the data packets may reach the destination network node via one or more other paths of the multiple paths.

Furthermore, such time-critical messages may be transmitted reliably.

A method of controlling a network node of a plurality of network nodes in a wireless network may comprise: receiving, by the network node, data packets from one or more other network nodes of the plurality of network nodes; and determining one or more network nodes of the plurality of network nodes to which the network node may forward data packets such that a number of the determined one or more network nodes is greater than a predefined first threshold and/or that a number of connections to the determined one or more network nodes is greater than a predefined second threshold. The method having the features described in this paragraph forms a seventeenth example.

The method may further comprise forwarding the received data packets to the determined one or more network nodes. The features described in this paragraph in combination with the seventeenth example form an eighteenth example.

A method for controlling a wireless network having a plurality of network nodes may comprise: transmitting data packets from a starting network node of the plurality of network nodes to a destination network node of the plurality of network nodes by means of one or more other network nodes of the plurality of network nodes, wherein each network node of the one or more other network nodes: determines one or more network nodes of the plurality of network nodes to which the network node may forward data packets, such that a number of the determined one or more network nodes is greater than a predefined first threshold and/or that a number of connections to the determined one or more network nodes is greater than a predefined second threshold; and forwards the data packets to the determined one or more network nodes. The method having the features described in this paragraph forms a nineteenth example.

A computer program product may store program instructions which, when executed, execute the method according to one or more of the seventeenth example through the nineteenth example. The computer program product described in this paragraph constitutes a twentieth example.

A computer program may store instructions that, when executed by a processor, cause the processor to perform a method according to one or more of the seventeenth example through the nineteenth example. The computer program described in this paragraph constitutes a twenty-first example.

A computer-readable medium may store instructions that, when executed by a processor, cause the processor to perform a method according to one or more of the seventeenth example through the nineteenth example. The computer-readable medium described in this paragraph constitutes a twenty-second example.

A nonvolatile medium may store instructions that when executed by a processor, cause the processor to perform a method according to one or more of the seventeenth example through the nineteenth example. The nonvolatile medium described in this paragraph constitutes a twenty-third example.

Depicted in.

In the following detailed description, reference is made to the accompanying drawings which form a part thereof and in which are shown, by way of illustration, specific embodiments in which the invention may be practiced.

The term "processor" may be understood as any type of entity that allows processing of data or signals. For example, the data or signals may be handled according to at least one (i.e., one or more than one) specific function performed by the processor. A processor may include or be formed from an analog circuit, a digital circuit, a mixed signal circuit, a logic circuit, a microprocessor, a central processing unit (CPU), a graphics processing unit (GPU), a digital signal processor (DSP), a programmable gate array (FPGA), an integrated circuit, or any combination thereof. Any other method of implementing the respective functions, described in more detail below, may also be understood to include a processor or logic circuit. It is understood that one or more of the method steps described in detail herein may be performed (e.g., implemented) by a processor, through one or more specific functions performed by the processor. The processor may therefore be configured to perform any of the information processing methods or components thereof described herein.

In decentralized wireless networks, data packets may be transmitted between two network nodes by means of other network nodes, i.e. forwarded by them. However, if a link between two of the network nodes breaks down, the data packets may not reach the destination network node, resulting in long downtimes and thus poor reliability of the wireless network. Various embodiments relate to a network node in a wireless network, a wireless network, and methods for controlling the same, which have increased reliability of data transmission by forwarding data packets from respective network nodes under predefined conditions.

Figure 1A:
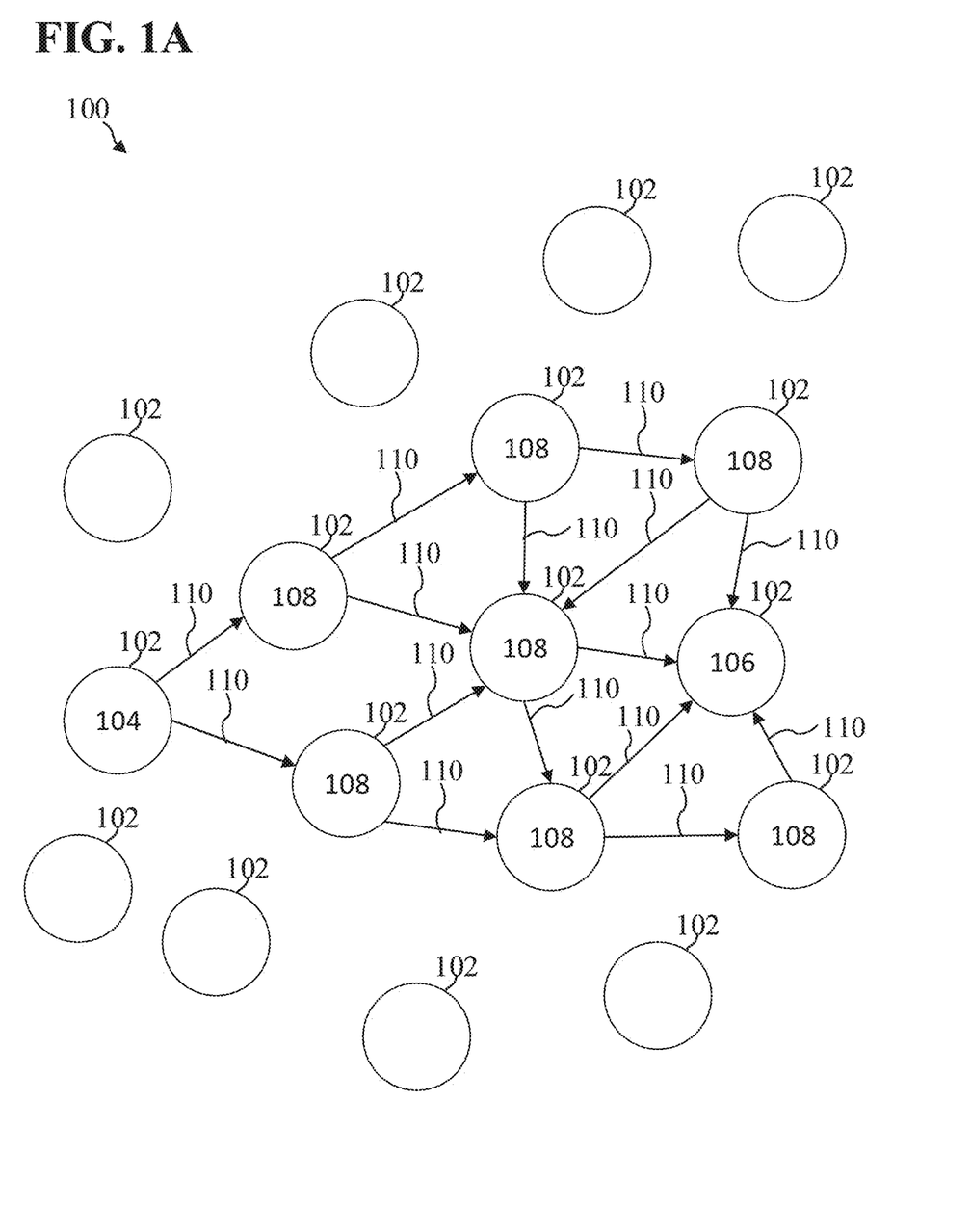
FIG. 1A is an exemplary wireless network according to various embodiments.

FIG. 1A illustrates an exemplary wireless network 100 according to various embodiments. The wireless network 100 may be a decentralized wireless network. The wireless network 100 may be a mesh wireless network. The wireless network 100 may be dynamic wireless network. The wireless network 100 may be, for example, a cellular network. The wireless network 100 may be, for example, a local area network (LAN), such as a WLAN network, a Bluetooth network, an ultra-wideband (UWB) network, a WiFi network, etc. The wireless network 100 may be, for example, a wide area network (WAN) and may use, for example, a 3G standard or a 4G standard, or may be a 5G network.

The wireless network 100 may include a plurality of network nodes 102. A network node, as used herein, may be associated with, for example, a mobile device (e.g. a smartphone, e.g., a smartwatch, e.g., a tablet, etc.), a server, or a router.

According to various embodiments, one or more network nodes of the plurality of network nodes 102 may be configured to receive and transmit data packets. According to various embodiments, one or more network nodes of the plurality of network nodes 102 may be configured to forward data packets. For example, the wireless network 100 may include a starting network node 104. The plurality of network nodes 102 may be configured such that the starting network node 104 may forward data packets to one or more destination network nodes, such as a destination network node of the plurality of network nodes 102, by means of one or more other network nodes 108 of the plurality 106 of network nodes 102. In this regard, at least one network node of the one or more other network nodes 108 may be configured to determine one or more network nodes of the plurality of network nodes 102 to which the at least one network node may forward data packets such that a number of the determined one or more network nodes is greater than a predefined first threshold and/or that a number of connections to the determined one or more network nodes is greater than a predefined second threshold.

Illustratively, these conditions may be referred to as diversity conditions. For example, the at least one network node may be set up according to the exemplary network node 200 described with reference to FIG. 2. It is noted that with reference to FIG. 1A, it is described for illustrative purposes how a network node may be set up. It is noted that a network node may, for example, comprise a receiving device configured to receive data packets, that a network node may, for example, comprise a transmitting device configured to transmit data packets, and/or that a network node may, for example, comprise one or more processors configured to perform the processing (e.g., determining) described herein (see, for example, FIG. 2 therefor).

For example, each of the one or more other network nodes 108 may be configured to determine one or more network nodes of the plurality of network nodes 102 to which the at least one network node may forward data packets such that a number of the determined one or more network nodes is greater than a predefined first threshold and/or that a number of connections to the determined one or more network nodes is greater than a predefined second threshold. For example, each network node of the plurality of network nodes 102 may be configured to determine one or more network nodes of the plurality of network nodes 102 to which the at least one network node may forward data packets such that a number of the determined one or more network nodes is greater than a predefined first threshold and/or that a number of connections to the determined one or more network nodes is greater than a predefined second threshold. Illustratively, a network node may ensure that data packets are transmitted to a minimum number of other network nodes and/or by means of a minimum number of connections to the other network nodes. In this way, the failure of another network node and/or the failure of a connection to one of the other network nodes may be intercepted, since the data packets are irrespective of this also transmitted to still other network nodes.

It is noted that determining other network nodes to which the network node may forward data packets, as described herein, also applies to sending a starting network node, as described herein, which initiates data transmission to a destination network node. In this case, the starting network node may be configured to determine one or more network nodes of the plurality of network nodes 102 to which the starting network node may send data packets such that a number of the determined one or more network nodes is greater than the first threshold and/or that a number of connections to the determined one or more network nodes is greater than the second threshold.

For illustrative purposes, the exemplary wireless network 100 is described below in several aspects such that each network node of the plurality of network nodes 102 is configured to determine one or more network nodes of the plurality of network nodes 102 to which the at least one network node may forward data packets such that a number of the determined one or more network nodes is greater than a predefined first threshold and/or that a number of connections to the determined one or more network nodes is greater than a predefined second threshold. It is noted, however, that according to various embodiments, only one network node or a plurality of network nodes of the plurality of network nodes 102 may be so configured.

In one example, FIG. 1A may be viewed such that the starting network node 104 transmits data packets to the destination network node 106 by means of the other network nodes 108. Here, the starting network node 104 may be configured to determine one or more network nodes of the plurality of network nodes 102 to which the at least one network node may forward data packets such that a number of the determined one or more network nodes is greater than a predefined first threshold value. The first threshold value may have any integer greater than or equal "0". Illustratively, a first threshold value equal to "0" means that the starting network node 104 determines at least one other network node of the plurality of network nodes 102 to which the starting network node 104 may forward the data packets.

Illustratively, a first threshold value equal to "1" means that the starting network node 104 determines at least two other network nodes of the plurality of network nodes 102 to which the starting network node 104 may transmit the data packets. According to various embodiments, the at least two other network nodes of the plurality of network nodes 102 may receive the data packets and each of the at least two other network nodes may determine at least two other network nodes of the plurality of network nodes 102 to which the respective network node may transmit the data packets. In this manner, it may be ensured that the data packets are transmitted through the wireless network 100 using multiple paths.

According to various embodiments, one network node (e.g., a plurality of network nodes, e.g., all network nodes) of the plurality of network nodes 102 may be configured to transmit data packets to a plurality of other network nodes using a data transmission. For example, a network node may be configured to use a multicast method or multicast communication. For example, as an illustrative example, the network node may use multicast WLAN communication to transmit the data packets to a plurality of other network nodes via a data transmission.

Figure 1B:
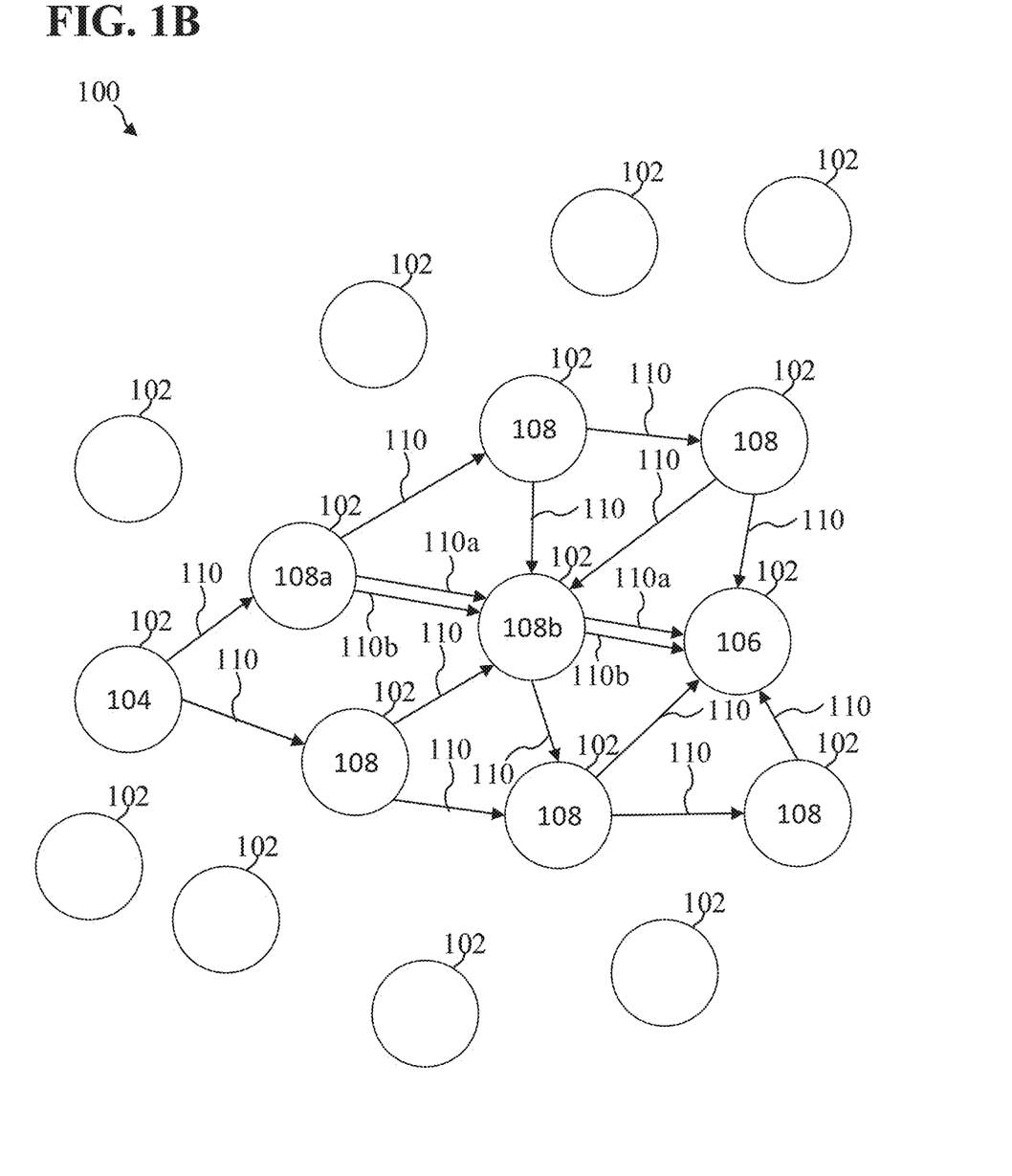
FIG. 1B is a further exemplary wireless network according to various embodiments.

A network node may be configured to send or forward data packets to another network node of the plurality of network nodes 102 if it can establish a connection to the other network node; for example, if it is within a range of the network node. A connection, as used herein, may be associated with a transmission channel (also referred to in some aspects as a communication channel). Each connection may be associated with a frequency. Each connection may be associated with a communication scheme (e.g., WLAN, e.g., Bluetooth, etc.). For example, a connection may be a WLAN connection between a network node and another network node. With reference to FIG. 1B, for example, one or more network nodes of the plurality of network nodes 102 may be configured to transmit data packets to other network nodes using at least two connections. As one example, a first network node 108a may be configured to transmit the data packets to a second network node 108b by means of a first connection 110a and by means of a second connection 110b. For example, the second network node 108b may be configured to also forward the data packets to the destination network node 106 using a first connection 110a and a second connection 110b. For example, the first connection 110a may be a WLAN connection and the second connection 110b may be, for example, a Bluetooth connection. According to various embodiments, the first connection 110a and the second connection 110b may be associated with the same communication scheme. For example, the first connection 110a and the second connection 110b may each be a WLAN connection. For example, the first connection 110a may be a 2.4 GHz WLAN connection and the second connection 110b may be a 5 GHz WLAN connection (e.g., according to standard 802.11n or 802.11ac).

At least one network node of the plurality of network nodes 102 may be configured to determine one or more network nodes of the plurality of network nodes 102 to which the at least one network node may forward data packets such that a number of connections to the determined one or more network nodes is greater than a predefined second threshold value. The second threshold value may be any integer greater than or equal to "1". Illustratively, a second threshold value equal to "1" means that the respective network node determines the other network nodes of the plurality of network nodes 102 such that the data packets are forwarded using at least two connections. In one example, at least one network node may be configured to determine one or more network nodes of the plurality of network nodes to which the network node may forward data packets such that a number of the determined one or more network nodes is greater than a predefined first threshold value and that a number of connections to the determined one or more network nodes is greater than a predefined second threshold value. In one example, the first threshold value may be equal to "0", for example, and the second threshold value may be equal to "1", for example. In this example, the network node may determine, for example, at least two network nodes to which the data packets may be forwarded or the network node may determine another network node to which the network node may forward the data packets using two links (e.g., using a 2.4 GHz WLAN link and a 5 GHz WLAN link). In another example, the first threshold may be equal to "1", for example, and the second threshold may be equal to "2", for example, and the network node may determine at least three network nodes to which the data packets may be forwarded or the network node may determine two other network nodes, wherein the data packets may be forwarded to one of the other network nodes using two connections.

Figure 2:
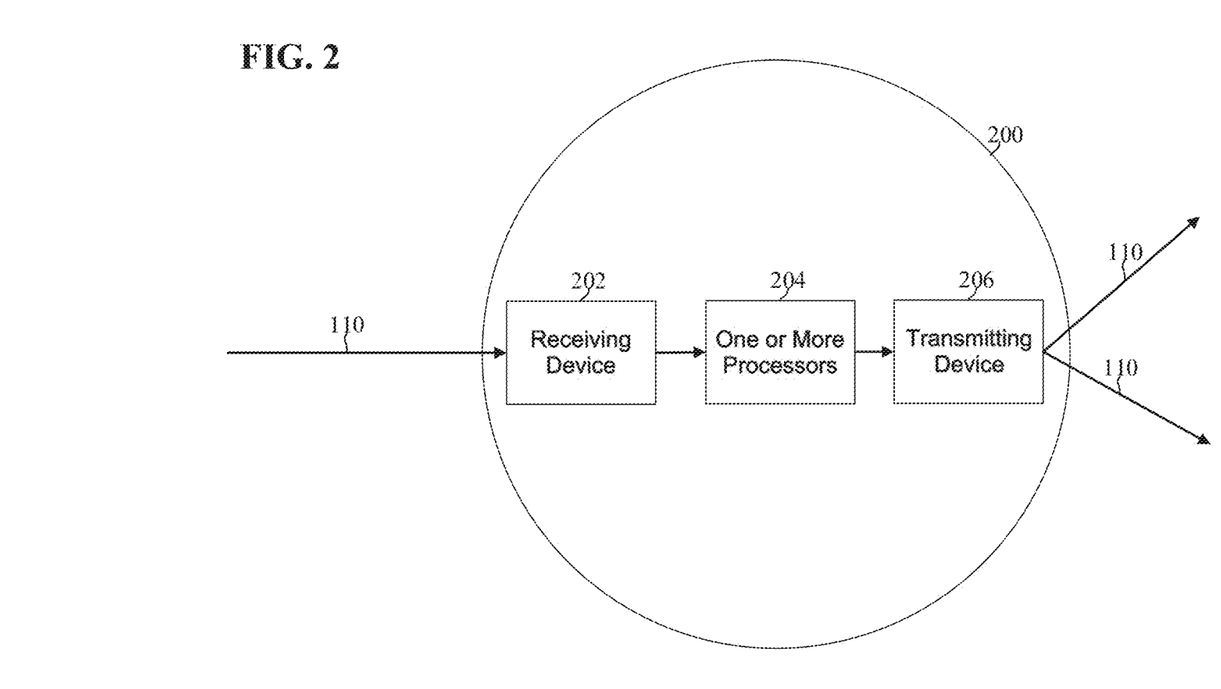
FIG. 2 is an exemplary network node according to various embodiments.

FIG. 2 illustrates an exemplary network node 200 according to various embodiments. According to various embodiments, one or more network nodes of the plurality of network nodes 102 may be set up in accordance with the network node 200.

The network node 200 may include a receiving device 202. The receiving device 202 may be configured to receive data packets from one or more other network nodes (e.g., one or more other network nodes of the plurality of network nodes 102). The receiving device 202 may be configured to receive data packets from one or more other network nodes of the plurality of network nodes 102 using a connection 110.

The network node 200 may include one or more processors 204. The one or more processors 204 may be configured to determine one or more network nodes of the plurality of network nodes 102 to which the network node may send and/or forward data packets, such that a number of the determined one or more network nodes is greater than the first threshold. The one or more processors 204 may be configured to determine one or more network nodes of the plurality of network nodes 102 to which the network node may send and/or forward data packets such that a number of connections to the determined one or more network nodes is greater than the second threshold.

The network node 200 may include a transmitting device 206. The transmitting device 206 may be configured to transmit data packets to the determined one or more network nodes. For example, the transmitting device 206 may be configured to forward the data packets received by means of the receiving device 202 to the determined one or more network nodes. According to various embodiments, the transmitting device 206 may be configured to transmit (e.g., send, e.g., forward) the data packets using at least two connections 110. The transmitting device 206 may be configured to transmit the data packets using at least two connections 110 having different frequency ranges from each other (e.g., using a 2.4 GHz WLAN connection and a 5 GHz WLAN connection). For example, the transmitting device 206 may be configured to use multicast transmission as described herein to transmit the data packets using one data transmission to multiple other network nodes.

According to various embodiments, the one or more processors 204 may be configured to determine whether data packets may be transmitted to network nodes of the plurality of network nodes 102 using a multicast connection. For example, a multicast connection may be preferred. The one or more processors 204 may be configured to determine the one or more network nodes such that data packets are transmitted to a plurality of network nodes using a multicast connection, if the one or more processors 204 previously determine that a multicast connection to other network nodes is possible.

According to various embodiments, the one or more processors 204 may be configured to determine potential network nodes to which the network node 200 may transmit data packets. The one or more processors 204 may be configured to determine, for each potential network node, a respective probability of receiving the data packets. The one or more processors 204 may be configured to determine, for each potential network node, the respective reception probability for the data packets using provided transmission measurement data. The transmission measurement data may include information regarding previous data transmissions using the respective network node.

According to various embodiments, the transmitting device 206 may be configured to forward the data packets to the determined one or more network nodes such that a reception probability for the data packets of each network node of the determined one or more network nodes is greater than a predefined third threshold. According to various embodiments, the one or more processors 204 may provide instructions such that the transmitting device 206 forwards the data packets to the determined one or more network nodes such that a receive probability for the data packets of each network node of the determined one or more network nodes is greater than the third threshold. According to various embodiments, the reception probability for the data packets may be increased by transmitting the data packets multiple times. According to various embodiments, the reception probability for the data packets may be increased by decreasing an associated data transmission rate. For example, the one or more processors 204 may be configured to determine the one or more network nodes such that the respective reception probability for the data packets is greater than the third threshold. In this regard, the one or more processors 204 may account for, for example, increasing the probability of reception by means of multiple transmissions and/or by means of decreasing the data transmission rate. For example, the instructions from the one or more processors 204 to the transmitting device 206 may include instructions regarding the determined one or more network nodes, connections associated with each of the determined one or more network nodes (e.g., transmitting multiple times, e.g., transmitting using two connections with a different frequency range from each other and/or different cellular technology from each other), and/or data transmission rates associated with each of the determined one or more network nodes.

Figure 3:
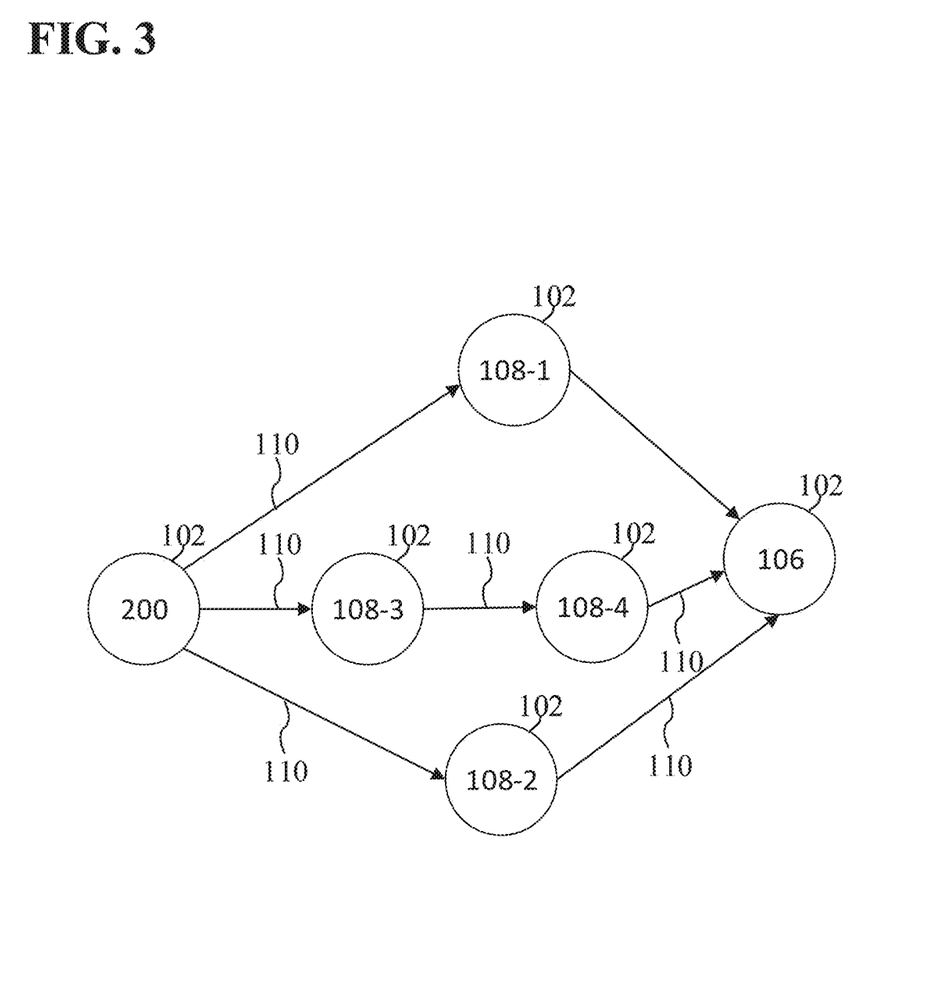
FIG. 3 is an illustrative representation for determining one or more forwarding network nodes according to various embodiments.

According to various embodiments, the one or more processors 204 may be configured to determine the one or more network nodes using a transmission metric. For example, a transmission metric may include or be based on an expected transmission count (ETX), an expected transmission time (ETT) metric. According to various embodiments, the transmission metric may use opportunistic routing. For example, the transmission metric may have or be based on an expected opportunistic transmission count (EOTX and/or an expected opportunistic transmission time (EOTT) metric. For an illustrative description of the transmission metric, reference is made to FIG. 3. For example, the one or more processors 204 of the network node 200 may be configured to determine one or more potential network nodes 108-1, 108-2, 108-3 to which the network node 20ß0 may forward data packets. The one or more processors 204 of the network node 200 may be configured to determine a respective transmission time for a connection for each of the one or more potential network nodes 108-1, 108-2, 108-3. The one or more processors 204 of the network node 200 may be configured to determine a respective reception probability for each of the one or more potential network nodes 108-1, 108-2, 108-3. According to various embodiments, the transmission metric may include a number of transmissions (e.g., ETX, e.g., EOTX) and/or a transmission time for connections (e.g., ETT, e.g., EOTT) from the network node 200 to the one or more target network nodes, such as the target network nodes 106. Illustratively, the one or more processors 204 may take into account the reception probability and/or transmission time for connections from the network node 200 to the destination network node 106 when determining the transmission metric. With reference to FIG. 3, the transmission metric for the potential network node 108-1 may include the transmission time for the connection 110 between the network node 200 and the potential network node 108-1 and/or the reception probability by the potential network node 108-1, and the transmission time for the connection 110 between the potential network node 108-1 and the destination network node 106 and/or the reception probability of the destination network node 106; the transmission metric may comprise, for the potential network node 108-2, the transmission time for the connection 110 between the network node 200 and the potential network node 108-2 and/or the reception probability by the potential network node 108-2, and the transmission time for the connection 110 between the potential network node 108-2 and the destination network node 106 and/or the reception probability of the destination network node 106; the transmission metric may comprise, for the potential network node 108-3, the transmission time for the connection 110 between the network node 200 and the potential network node 108-3, between the potential network node 108-3 and the potential network node 108-4, and between the potential network node 108-4 and the target network node 106, and the respective reception probability by the potential network node 108-3, of the potential network node 108-4 and/or of the destination network node 106, respectively. Illustratively, low reception probabilities may, for example, result in multiple transmissions being required so that a transmission time may also be greater.

The one or more processors 204 of the network node 200 may be further configured to determine a respective distance from the network node 200 for each of the one or more potential network nodes 108-1, 108-2, 108-3. According various embodiments, the one or more processors 204 may determine, for each of the one or more potential network nodes 108-1, 108-2, 108-3, a distance traveled toward the target network node 106 using the respective determined distance. With reference to FIG. 3, the distance traveled to the potential network node 108-2 may be greater than the distance traveled to the potential network node 108-3. According to various embodiments, the respective distance traveled toward the target network node 106 may be determined using channel information.

According to various embodiments, the distance traveled in the direction of the target network node 106 may include, for example, a distance remaining to the target network node 106. For example, the distance remaining between the potential network node 108-2 and the target network node 106 may be less than the distance remaining between the potential network node 108-3 and the target network node 106. Thus, in this example, the distance traveled toward the target network node 106 may be greater for the potential network node 108-2 than for the potential network node 108-3.

According to various embodiments, the one or more processors 204 of the network node 200 may be configured to determine a distance metric. For example, the distance metric may be a ratio of the distance traveled (e.g., the distance traveled in the direction of the destination network node 106) and the transmission metric.

According to various embodiments, the one or more processors 204 of the network node 200 may be configured to determine one or more network nodes from the one or more Potential network nodes 108-1, 108-2, 108-3 such that a number of the determined one or more network nodes is greater than the first threshold value and such that the value determined for the one or more network nodes is increased according to the distance metric. According to various embodiments, the one or more processors 204 of the network node 200 may be configured to determine one or more network nodes from the one or more potential network nodes 108-1, 108-2, 108-3 such that a number of connections to the determined one or more network nodes is greater than the second threshold value and such that the value determined for the one or more network nodes is increased according to the distance metric. Illustratively, the one or more processors 204 of the network node 200 may be configured to determine one or more network nodes from the one or more potential network nodes 108-1, 108-2, 108-3 such that one or more of the diversity conditions are satisfied and such that the value determined for the one or more network nodes is increased according to the distance metric. Illustratively, the one or more network nodes may be selected such that the value determined for those network nodes is increased (e.g., maximized) according to the distance metric, with the diversity conditions (e.g., a number of the determined one or more network nodes greater than the first threshold and/or a number of connections to the determined one or more network nodes greater than the second threshold) employed as constraints. These diversity conditions may ensure that even if a connection and/or a network node fails, the data packets continue to reach the destination network node without requiring retransmission of the data packets.

According to various embodiments, the one or more processors 204 of the network node 200 may be configured to determine an efficiency metric. The one or more processors 204 of the network node 200 may be configured to determine the efficiency metric using the determined distance metric. The efficiency metric may be, for example, a ratio of the distance metric of a potential network node and an effort value. The effort value may be, for example, indirectly proportional to a number of network nodes to which data packets may be sent via a transmission using a multicast connection. For example, the effort value may be proportional to a number of transmissions required to transmit the data packets. Illustratively, a value according to the efficiency metric may become larger when the required number of transmissions (e.g., due to multicast transmission) becomes smaller.

According to various embodiments, the one or more processors 204 may be configured to determine the efficiency metric as a ratio of the distance traveled and a transmission effort. The transmission effort may be determined using the transmission metric and the effort value. Illustratively, the transmission metric may have, for example, an expected transmission number and/or an expected transmission time, and the transmission overhead may additionally have the overhead value, such that a possible multicast connection may reduce the transmission overhead. For example, the transmission effort may consider a number of connections, a multicast communication, a number of transmissions, etc.

For example, the one or more processors 204 may be configured to determine a respective value according to the efficiency metric for each potential network node of the one or more potential network nodes 108-1, 108-2, 108-3.

According to various embodiments, the one or more processors 204 may be a value according to the efficiency metric for a respective potential selection of one or more network nodes. Here, the value according to the efficiency metric may be determined, for example, from the ratio of the summed distance traveled to the summed transmission overhead. The summed transmission effort may be determined (for example, as a sum or product) from a sum of a respective value according to a transmission metric and from the effort value. Illustratively, the efficiency metric, E, may be described using equation (1):

$$i.E = \frac{\sum_i^N D_i}{\sum_i^N ÜM_i * A},\qquad(1)$$

where N is the number of one or more network nodes, where $D_i$ is the distance traveled for a respective network node of the one or more network nodes, where $ÜM_i$ is the value according to a transmission metric (e.g., ETX, e.g., ETT, e.g., EOTX, e.g., EOTT) for a respective network node of the one or more network nodes, and wherein A is the effort value.

According to various embodiments, the one or more processors 204 of the network node 200 may be configured to determine one or more network nodes from the one or more potential network nodes 108-1, 108-2, 108-3 such that a number of the determined one or more network nodes is greater than the first threshold value and such that the value determined for the one or more network nodes is increased (e.g., maximized) according to the efficiency metric. According to various embodiments, the one or more processors 204 of the network node 200 may be configured to determine one or more network nodes from the one or more potential network nodes 108-1, 108-2, 108-3 such that a number of connections to the determined one or more network nodes is greater than the second threshold value and such that the value determined for the one or more network nodes is increased (e.g., maximized) according to the efficiency metric. Illustratively, the one or more processors 204 of the network node 200 may be configured to determine one or more network nodes from the one or more potential network nodes 108-1, 108-2, 108-3 such that one or more of the diversity conditions are satisfied and such that the value determined for the one or more network nodes is increased according to the efficiency metric. Illustratively, the one or more network nodes may be selected such that the value determined for those network nodes is increased (e.g., maximized) according to the efficiency metric, wherein the diversity conditions (e.g., a number of the determined one or more network nodes greater than the first threshold value and/or a number of connections to the determined one or more network nodes greater than the second threshold value) are employed as constraints.

In one example, a diversity condition may be that a number of the determined one or more network nodes is greater than "1" (i.e., the first threshold value is equal to "2" in this example). In this example, the one or more processors 204 may determine the following for the potential network nodes 108-1, 108-2, 108-3, for example:

that a multicast connection is not possible for any of the potential network nodes 108-1, 108-2, 108-3;

that the respective reception probability for each of the potential network nodes 108-1, 108-2, 108-3 is greater than the third threshold value (so that, for example, it may be determined that no multiple transmissions are required for the data packets);

that the transmission overhead to each of the potential network nodes 108-1, 108-2, 108-3 is substantially the same; and based thereon, the one or more processors 204 may determine that the potential network node 108-1 has the largest value according to the efficiency metric (against distance traveled toward the target network node 106 relative to transmission overhead) of the potential network nodes 108-1, 108-2, 108-3 based on the largest distance traveled toward the target network node 106, and that the potential network node 108-2 has the next largest value according to the efficiency metric. In this example, the one or more processors 204 may determine the potential network node 108-1 and the potential network node 108-2 to be the one or more network nodes such that the diversity condition (that the number of determined one or more network nodes is greater than "1") is satisfied.

In another example, unlike the previous example, the one or more processors 204 may determine for the potential network nodes 108-1, 108-2, 108-3 that a multicast connection is possible for the potential network nodes 108-1 and 108-3. Based on this, the one or more processors 204 may also determine that the potential network node 108-1 has the greatest value according to the efficiency metric due to the greatest distance traveled toward the destination network node 106 as well as the fact that a multicast connection possible (which reduces the overhead value). In this example, the one or more processors 204 may determine that although the distance traveled in the direction of the destination network node 106 for the potential network node 108-3 is less than the distance traveled in the direction of the destination network node 106 for the potential network node 108-2, the potential network node 108-3 has a larger value according to the efficiency metric than the potential network node 108-2, because a multicast connection is possible for the potential network node 108-3 together with the potential network node 108-1, so that the effort value is reduced.

Figure 4:
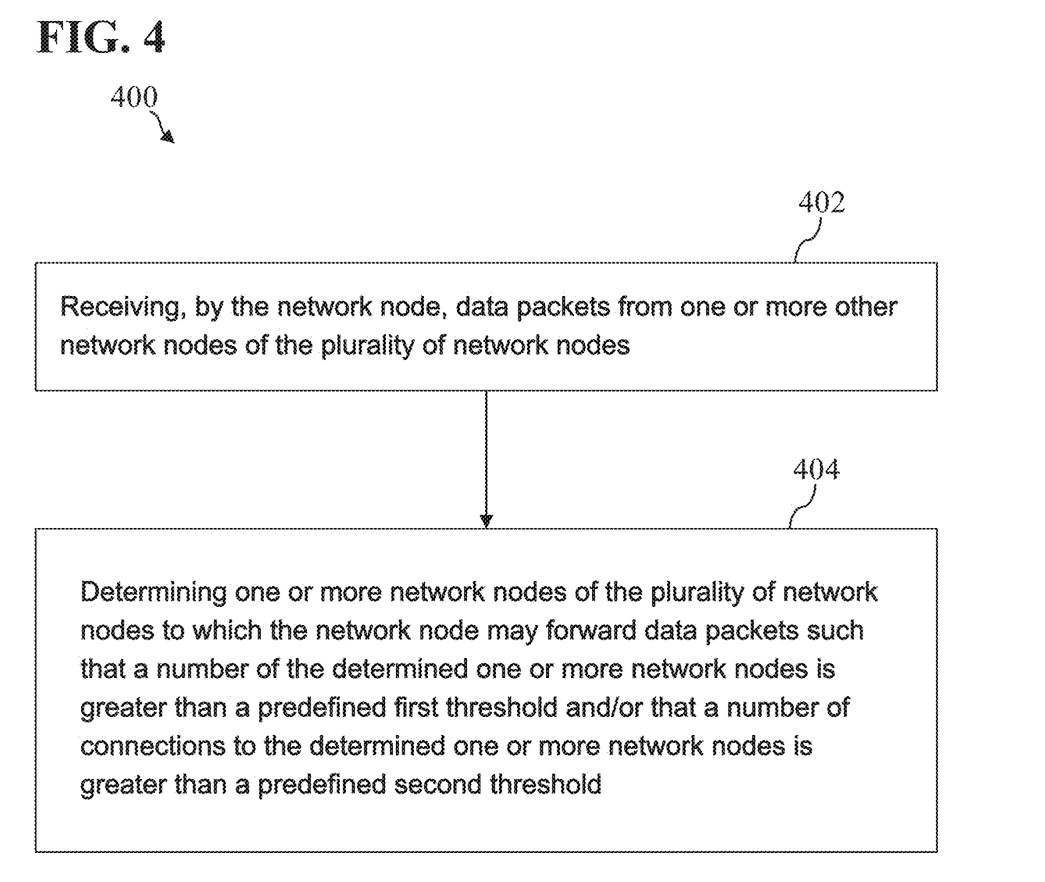
FIG. 4 is a method for controlling a network node in a wireless network according to various embodiments.

FIG. 4 illustrates a method 400 for controlling a network node of a plurality of network nodes in a wireless network according to various embodiments.

The method 400 may comprise receiving, by means of the network node, data packets from one or more other network nodes of the plurality of network nodes (at 402).

The method 400 may include determining one or more network nodes of the plurality of network nodes to which the network node may forward data packets such that a number of the determined one or more network nodes is greater than a predefined first threshold and/or that a number of connections to the determined one or more network nodes is greater than a predefined second threshold (at 404).

Optionally, the method 400 may further comprise forwarding the received data packets to the determined one or more network nodes.

According to various embodiments, a method for controlling a network node of a plurality of network nodes in a wireless network may include determining one or more network nodes of the plurality of network nodes to which the network node may send data packets such that a number of the determined one or more network nodes is greater than a predefined first threshold and/or that a number of connections to the determined one or more network nodes is greater than a predefined second threshold. According to various embodiments, the method may comprise sending data packets to the determined one or more network nodes.

Figure 5:
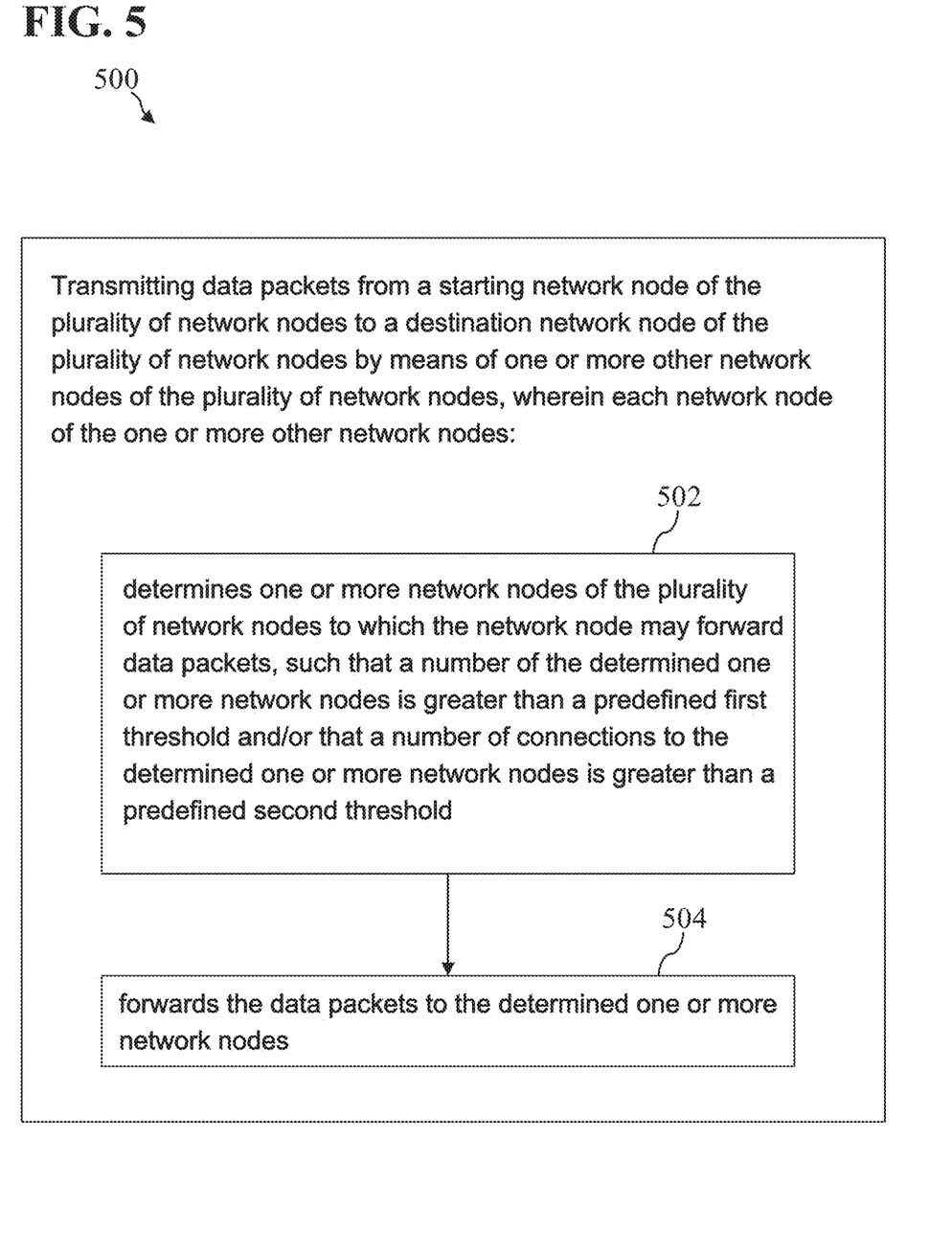
FIG. 5 is a method for controlling a wireless network according to various embodiments.

FIG. 5 illustrates a method 500 for controlling a wireless network having a plurality of network nodes according to various embodiments.

The method 500 may comprise transmitting data packets from a starting network node of the plurality of network nodes to a destination network node of the plurality of network nodes by means of one or more other network nodes of the plurality of network nodes.

The method 500 may comprise each network node of the one or more other network nodes determining one or more network nodes of the plurality of network nodes to which the network node may forward data packets such that a number of the determined one or more network nodes is greater than a predefined first threshold and/or that a number of connections to the determined one or more network nodes is greater than a predefined second threshold (at 502).

The method 500 may comprise each network node of the one or more other network nodes forwarding (in 504) the data packets to the determined one or more network nodes.

According to various embodiments, the starting network node may determine one or more network nodes of the plurality of network nodes to which the starting network node may send data packets such that a number of the determined one or more network nodes is greater than a predefined first threshold and/or that a number of connections to the determined one or more network nodes is greater than a predefined second threshold. According to various embodiments, the starting network node may send the data packets to the determined one or more network nodes.

The invention claimed is:

1. A wireless network, comprising:
   a first network node,
   a second network node, wherein the second network node is adjacent to the first network node;
   a third network node, wherein the third network node is adjacent to the second network node;
   wherein each network node from the first network node, the second network node and the third network node comprises:
     a receiving device configured to receive data packets from one or more other network nodes of a plurality of network nodes;
     one or more processors configured to determine one or more network nodes of the plurality of network nodes to which the network node can forward data packets such that a number of the determined one or more network nodes is greater than a predefined first threshold and that a number of connections to the determined one or more network nodes is greater than a predefined second threshold, wherein the predefined second threshold is an integer value greater than or equal to 1;
     wherein the one or more processors are further configured to determine the one or more network nodes of the plurality of network nodes to which the network node can forward data packets using a ratio of a distance traveled in the direction of a destination network node and a transmission metric, wherein the transmission metric takes into account the reception probability and/or transmission time for connections from the network node to a predefined destination network node when determining the transmission metric; and
     a transmitting device configured to forward the received data packets to the determined one or more network nodes of the plurality of network nodes;
   wherein the transmitting device of the first network node is configured to forward the received data packets to the second network node by means of a first connection and by means of a second connection determined by the one or more processors of the first network node; and
   wherein the transmitting device of the second network node is configured to forward the received data packets from the first network node to the third network node by means of a first connection and to forward the received data packets from the first network node to the third network node by means of a second connection determined by the one or more processors of the second network node to thereby increase a probability that the received data packets will reach the predefined destination network node.

2. The wireless network of claim 1,
   wherein the first connection and the second connection determined by the one or more processors of the first network node have mutually different assigned frequency ranges; and
   wherein the first connection and the second connection determined by the one or more processors of the second network node have mutually different assigned frequency ranges.

3. The wireless network of claim 1,
   wherein the transmitting devices are configured to forward the data packets to the respectively determined one or more network nodes in the direction of one or more destination network nodes.

4. The wireless network of claim 1,
   wherein the transmitting devices are configured to transmit the data packets respectively to a plurality of network nodes of the determined one or more network nodes by means of multicast communication.

5. The wireless network of claim 4,
   wherein the one or more processors of each network node are configured to determine whether the data packets can be transmitted to multiple network nodes by means of the multicast communication; wherein the one or more processors of each network node are configured to determine the one or more network nodes of the plurality of network nodes such that:
     the number of detected one or more network nodes is greater than the predefined first threshold and/or the number of connections to the detected one or more network nodes is greater than the predefined second threshold; and
     the data packets are transmitted to a plurality of the one or more network nodes using the multicast communication, if the one or more processors determine that the data packets can be transmitted to a plurality of network nodes using the multicast communication.

6. The wireless network of claim 1,
   wherein the one or more processors of each network node are configured to determine, for each potential network node to which the network node may forward data packets, a reception probability for the data packets using provided transmission measurement data; and
   wherein the transmitting device is configured to forward the data packets to the one or more network nodes such that the reception probability for the data packets of each network node of the determined one or more network nodes is greater than a predefined third threshold value.

7. The wireless network of claim 1,
   wherein the one or more processors of each network node are configured to determine the one or more network nodes of the plurality of network nodes to which the network node can forward data packets such that the number of determined one or more network nodes is greater than the predefined first threshold and that the number of connections to the determined one or more network nodes is greater than the predefined second threshold;
   wherein the predefined first threshold value is greater than or equal to one, wherein the predefined second threshold value is greater than or equal to two, and wherein the predefined second threshold value is greater than the predefined first threshold value.

8. The wireless network of claim 1,
where the predefined first threshold is greater than or equal to one.

9. The wireless network of claim 1,
wherein the one or more processors are configured to determine the one or more network nodes of the plurality of network nodes in accordance with a selection operation, the selection operation comprising:
determining one or more potential network nodes to which the network node can forward data packets;
determining a respective distance from the network node for each of the one or more potential network nodes;
determining a respective transmission overhead for each of the one or more potential network nodes;
determining one or more network nodes from the one or more potential network nodes such that
the number of detected one or more network nodes is greater than the predefined first threshold or the number of connections to the detected one or more network nodes is greater than the predefined second threshold, and
a ratio of the summed distance of the determined one or more network nodes and the transmission overhead to the determined one or more network nodes is increased.

10. The wireless network of claim 1,
wherein the network node is associated with a mobile device, a server or a router.

11. The wireless network of claim 2,
wherein the respective first connection is a 2.4 GHz WLAN connection; and
wherein the respective second connection is a 5 GHz WLAN connection.

12. The wireless network of claim 1,
wherein the respective first connection is a WLAN connection; and
wherein the respective second connection is a Bluetooth connection.

13. A network node in a wireless network, the network node comprising:
a receiving device configured to receive data packets from one or more other network nodes of a plurality of network nodes;
one or more processors configured to determine one or more network nodes of the plurality of network nodes to which the network node can forward data packets such that a number of the determined one or more network nodes is greater than a predefined first threshold and that a number of connections to the determined one or more network nodes is greater than a predefined second threshold, wherein the predefined second threshold is an integer value greater than or equal to 1; and
a transmitting device configured to forward the received data packets to the determined one or more network nodes of the plurality of network nodes via a plurality of connections to each of the determined one or more network nodes;
wherein the one or more processors are configured
to determine the one or more network nodes of the plurality of network nodes to which the network node can forward data packets using an efficiency metric,
to determine the efficiency metric using a distance metric,
to determine the distance metric as a ratio of a distance traveled in the direction of a destination network node and a transmission metric,
wherein the one or more processors are configured to take into account the reception probability and/or transmission time for connections from the network node to a predefined destination network node when determining the transmission metric.

14. The wireless network of claim 13,
wherein the one or more processors are configured to determine the transmission metric based on an expected transmission count and/or an expected transmission time for each connection for each of one or more potential network nodes.

15. The wireless network of claim 13,
wherein the one or more processors are configured to determine the efficiency metric as a ratio of the distance metric of a potential network node and an effort value, wherein the effort value is indirectly proportional to a number of network nodes to which data packets may be sent via a transmission using a multicast connection or wherein the effort value is proportional to a number of transmissions required to transmit the data packets.

16. The wireless network of claim 13,
wherein the one or more processors are configured to determine a value i.E according to the efficiency metric E for a respective potential selection of one or more network nodes in accordance with the following equation:

$$i.E = \frac{\sum_i^N D_i}{\sum_i^N ÜM_i * A}$$

wherein
i denotes a network node index,
N denotes a number of the one or more network nodes,
$D_i$ denotes the distance traveled in the direction of the destination network node,
$ÜM_i$ denotes the value according to the transmission metric, and
A denotes the effort value.

17. The wireless network of claim 13,
wherein the first connection and the second connection determined by the one or more processors have mutually different assigned frequency ranges.

18. The wireless network of claim 13,
wherein the transmitting devices are configured to transmit the data packets respectively to a plurality of network nodes of the determined one or more network nodes by means of multicast communication.

19. The wireless network of claim 17,
wherein a first connection of the plurality of connections is a 2.4 GHz WLAN connection; and
wherein a second connection of the plurality of connections is a 5 GHZ WLAN connection.

20. The wireless network of claim 13,
wherein a first connection of the plurality of connections is a WLAN connection; and
wherein a second connection of the plurality of connections is a Bluetooth connection.

* * * * *